Jan. 1, 1963 L. R. BLOCKER 3,071,198
CULTIVATING AND WEEDER ATTACHMENT FOR TRACTORS
Filed Jan. 15, 1960 2 Sheets-Sheet 1

Leo R. Blocker
INVENTOR.

BY *Clarence A. O'Brien*
and *Harvey B. Jacobson*
Attorneys

Jan. 1, 1963 L. R. BLOCKER 3,071,198
CULTIVATING AND WEEDER ATTACHMENT FOR TRACTORS
Filed Jan. 15, 1960 2 Sheets-Sheet 2
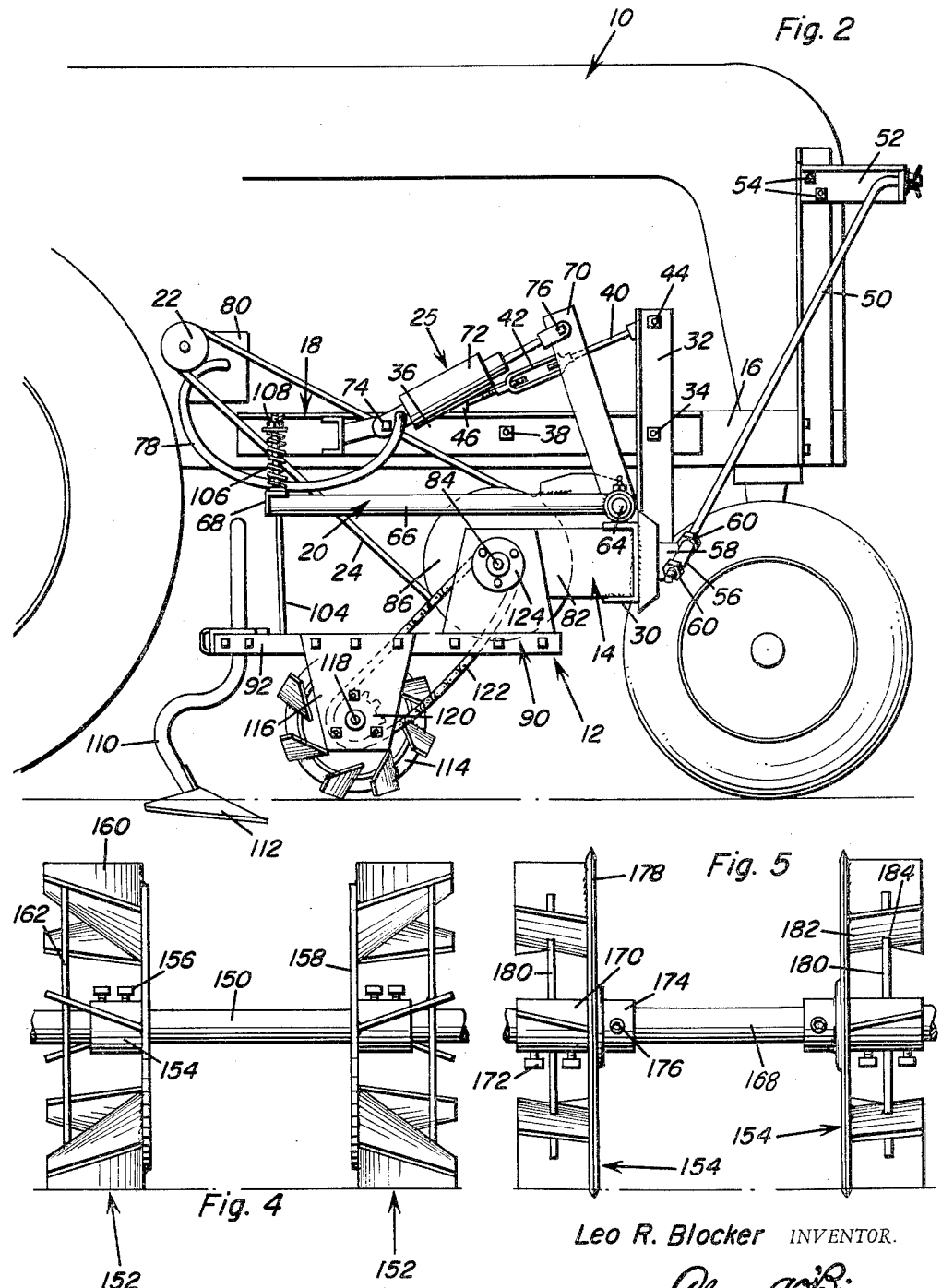
Leo R. Blocker INVENTOR.

United States Patent Office 3,071,198
Patented Jan. 1, 1963

3,071,198
CULTIVATING AND WEEDER ATTACHMENT
FOR TRACTORS
Leo R. Blocker, Shelly, Minn.
Filed Jan. 15, 1960, Ser. No. 2,657
9 Claims. (Cl. 172—123)

This invention comprises a novel and useful cultivating and weeder attachment for tractors and more particularly relates to an agricultural device to facilitate the cultivating and working of individual rows of crops with the use of a tractor or other vehicle.

The principal object of this invention is to provide an agricultural device of such construction that it may be quickly and readily applied to a tractor or other vehicle whereby the device may be maneuvered and rendered mobile by the use of the vehicle and may derive the necessary power for its operation from the power plant of the vehicle.

A further object of the invention is to provide an agricultural device in accordance with the preceding objects which shall be so constructed as to permit ready adjustment of the same in order to adapt the device to effectively work or cultivate individual crop rows despite irregularities in the contour of the ground and despite different widths and spacings of the crop rows.

A still further object of the invention is to provide an agricultural device in accordance with the preceding objects which shall be capable of being readily raised or lowered into and out of operative contact with the soil of the crop rows as desired.

A more specific object of the invention is to provide an agricultural device which shall include crop cultivating and weeding elements specifically designed for cultivating and/or weeding such crops as sugar beets, corn, soya beans and the like and wherein rotary cultivating tools may be reversely mounted on their axles so that in weeding operations they will throw weeds rearwardly and outwardly and away from a row of plants straddled thereby and in cultivating will throw earth or soil rearwardly and inwardly toward the row for hilling purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the invention taken from the right side of the device and its mounting upon the vehicle and showing certain details of the means for adjustably supporting and operating the device; and FIGURES 3–5 are elevational views showing different forms of rotating implements or tools adapted to be supported and operated by the device.

Figure 1:
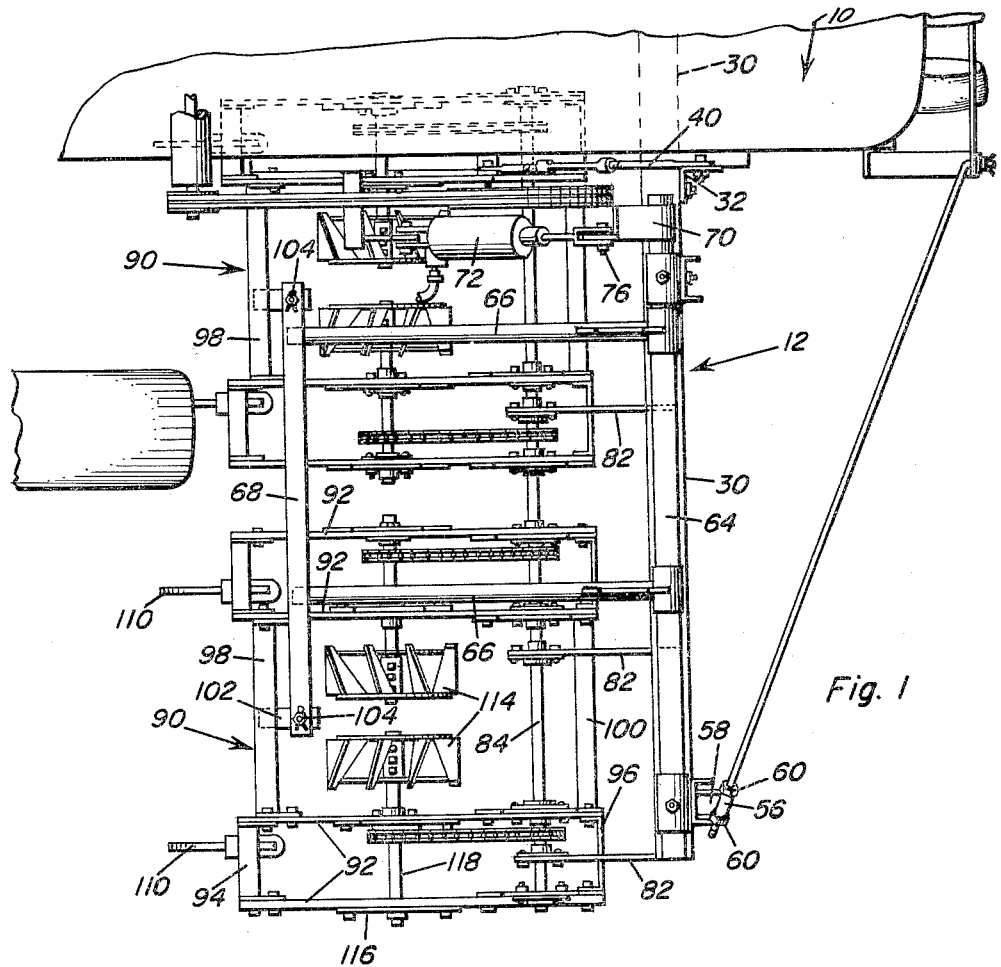
FIGURE 1 is a fragmentary top plan view of the invention showing the manner in which the same is removably and adjustably mounted upon a tractor or other vehicle for operation and transport thereby.

In dicated generally by the numeral 10 is a tractor of any suitable and conventional type, or other motor vehicle upon which the agricultural device of this invention designated generally by the numeral 12 is adapted to be detachably mounted, carried and powered by the vehicle. The agricultural device shown in FIGURES 1 and 2 is duplicated on opposite sides of the vehicle and since the construction of the device on opposite sides of the vehicle is identical, only that portion of the device which is shown on the right side of the vehicle will be hereinafter described and except when otherwise pointed out it will be understood that the construction is duplicated for the other side of the vehicle.

Referring now to FIGURE 2 in particular it will be understood that the agricultural device includes a relatively stationary but adjustable support frame indicated generally at 14 which is secured to side frame members 16 of the tractor or vehicle by a mounting means designated generally by the numeral 18 and carries for vertical swinging movement pivotally mounted carriage 20.

The power take-off of the tractor or vehicle is shown at 22 and by driving means such as a belt 24 imparts rotation to certain elements of the device as set forth hereinafter.

An actuating means indicated generally at 25 serves to adjustably raise and lower the carriage 20 and the instrumentalities carried thereby.

Referring now to both FIGURES 1 and 2 it will be observed that the support frame 14 consists of a rigid beam 30 which may conveniently be in the form of a channel member or the like and extends transversely beneath the side frame member 16 of the tractor or vehicle 10 in a direction which is transverse to the path of movement of the vehicle. The support beam 30 is fixedly secured to the lower end of a pair of support levers 32 which are vertically disposed on opposite sides of the vehicle 10 and are pivotally connected as by a pivot or bolt 34 to the longitudinally extending beams 36 which constitute a part of the mounting means 18. It will thus be apparent that by pivoting the supper levers 32 about their pivots 34, the entire support frame 14 can be given a vertical swinging movement about the horizontal axis of the pivot pins 34.

The longitudinal mounting beams 36 are detachably but fixedly secured to the sides 16 of the vehicle 10 as by bolts 38 thus enabling the entire support frame and thus the elements carried thereby to be readily applied to or removed from a tractor or other vehicle as desired.

An adjustable brace rod 40 provided with a turnbuckle or the like 42 is connected at 44 to the upper end of support lever 32 and to a suitable anchor bracket 46 upon the longitudinal member 36 to thus effect adjustable tilting of the support frame 14 about the axis of the pivot pins 34. In this manner, the initial position of the carriage 20 and the elements carried thereby with respect to the soil or terrain over which the device passes can be readily adjusted.

In order to further brace the laterally projecting sections of the device, there are provided diagonally projecting brace rods 50 having their upper ends secured to brackets 52 carried by the front portion of the vehicle 10 in any suitable manner as for example by bolts 52. The other ends of the brace rods 50 extend through sleeves 56 carried by brackets 58 which are secured to the previously mentioned horizontally transversely extending support beam 30. The rods 50 extending through the sleeves 56 are provided with adjusting nuts as at 60 whereby to adjust the tension upon the rods as desired. It will be observed that the pivotal connection of the upper ends of the rods 50 and the bracket 52 as well as the adjustment afforded by the nut 60 will enable the rods to be adjusted for any given position of the support frame 14 as the support arms 32 are adjusted by the rod 40.

From FIGURES 1 and 2 it will be seen that a transversely and horizontally disposed axle or shaft 64 is journaled upon the top of the transversely extending support beam 30 in suitable bearings, this axle having a plurality of rigidly attached rearwardly and horizontally extending arms 66 thereon which at their rearward extremities have secured thereto a transversely extending lift bar 68. At that end of the axle 64 which is immediately adjacent to the vehicle 10 there is provided a fixedly secured actuating arm 70 to which the actuating means 25 is connected. It will be understood that upon operation of the actuating means 25, the arms 70 will be oscillated about the transverse axis of the axle or shaft 64 and thus in turn will raise and lower the carriage 14 which carriage it will now be seen consists of the shaft 64, the lift arm 66 and the lift bar 68.

The actuating means 25 may be of any convenient design, that illustrated consisting of a fluid pressure operated piston and cylinder unit 72 having a pivotal connection at 74 to a longitudinal member 36 of the mounting means and having a further pivotal connection at 76 to the extremity of the actuating arm 70. A fluid pressure conduit such as that shown at 78 is connected to the fluid pressure actuated cylinder piston unit 72 and to the fluid pressure power take-off 80 with which the tractor or vehicle 10 is equipped in order to supply power for effecting vertical swinging or tilting of the support frame 20.

With continuing reference to FIGURES 1 and 2 it will be observed that the support frame 14 further includes a set of rearwardly extending support brackets in the form of plates 82. At their rearward ends these plates rotatably support by suitable bearings a shaft 84 which serves the dual functions of providing a pivot or axle about which a plurality of tool units indicated generally by the numeral 90 are adapted to pivot and also comprises a drive shaft provided with a gear or pulley 86 connected as by a belt or chain 24 to the power take-off 22 of the vehicle 10.

Referring now especially to FIGURE 1 it will be observed that each of the individual tool units 90 comprises an open framework which supports the tools which are adapted to cultivate or otherwise work one crop row. Thus, the open framework of each tool unit includes pairs of parallel rearwardly extending bars or plates 92 which are rigidly connected in spaced relation to each other as by cross members 94 and 96 at their rear and front ends respectively. The pairs of supports 92 in turn are connected in rigid spaced relation as by rear and front braces 98 and 100. It will be observed that the support plates 92 are journaled upon the shaft or axle 84 so that the entire unit can be readily raised and lowered about the axis of the shaft as a pivot by a means to be subsequently described.

As shown in FIGURE 1 the braces 98 have forwardly projecting brackets 102 to which are secured vertical rods 104. The rods 104 extend upwardly through suitable apertures in the lift bar 68 and as shown in FIGURE 2 are provided with compression springs 106 which bear against nuts or spring retainers 108 on the upper ends of the rods 104 and against the lift bar 68. It will thus be observed that this fastening means constitutes a vertically resilient connection between the rearward ends of the lift rods or arms 66 of the carriage 20 and the rearward ends of the tool units 90. As so far described it will now be apparent that upon actuation of the actuating means 25, the carriage 20 will be lifted or tilted upwardly about its axle 64 and through the resilient connection just described will lift the rearward ends of the tool units 90 and cause them to pivot about the axis of their shaft 84. Thus, the tool units can be raised out of operative contact with the soil when it is desired to facilitate movement of the device from one cultivating area to another and can be lowered in desired contact with the ground. The springs will impart resilient action to the individual tool units so that they may accommodate themselves to the contour of the terrain in which they are employed.

Each of the pairs of supports 92 of each tool unit has adjustably mounted upon its rear end tool support posts 110 carrying plows or the like 112. As will be readily understood, the support posts may be vertically adjusted as well as laterally adjusted upon the members 94 in order to properly position these tools for the desired action upon a crop row.

Also carried by the tool units 90 are rotating tools each indicated at 114. Referring to FIGURE 2 it will be observed that each of the support plates or bars 92 has secured thereto a downwardly extending mounting bracket 116. A rotating tool axle 118 extends transversely through and is journaled in these brackets so that the projecting inward end of the axle is disposed in the space between the two pairs of brackets whereby the axles are mounted in cantilever fashion and support at their adjacent inward ends the rotating tools 114 in the manner shown in FIGURE 1.

Each of the axles in the space between the supports 92 of a pair of supports is provided with a sprocket gear 120 which is connected by a sprocket chain 122 with a drive sprocket 124 on the previously mentioned axle or shaft 84. Thus upon rotation of the latter, rotation will be imparted to the axle 118 to the rotary tools 114 carried thereby.

It will be observed from FIGURE 1 that the pair of axles 118 of each of the tool units 90 is disposed in axial alignment whereby the ends of the axles and the rotating tools 114 carried thereby are disposed in spaced relation to straddle and receive therebetween a crop row. Each of the rotary tools 114 is axially adjustable upon its axle in order to permit variation of this spacing to accommodate rows of different widths and also to enable the rotary tools of adjacent units to vary the spacing therebetween to thus accommodate different spacings between rows to be cultivated.

In accordance with this invention a number of interchangeable rotary tools 114 can be readily employed to thus adapt the device to perform different specific operations in the working of crop rows. This interchanging can be readily effected by sliding the individual rotary tools 114 off the exposed ends of their axles, it being understood that the spacing between the adjacent ends of the axles will be sufficient for this purpose.

Figure 3:
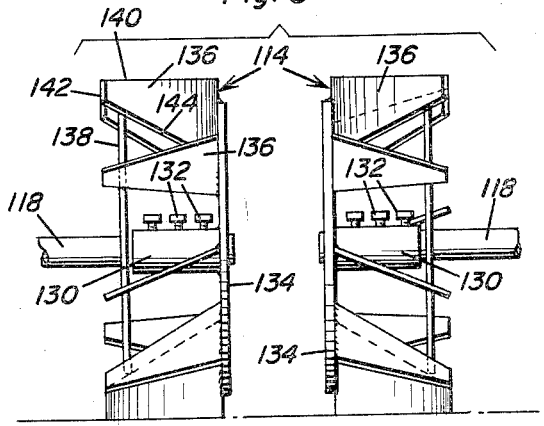

Considering first the form of rotary tools 114 as shown in FIGURES 1, 2 and 3 it will be observed that each includes a sleeve-like hub portion 130 which is slidably received upon the axle 118 and is adjustably secured thereon as by fastening screws at 132. Each hub is further provided with an integral annular flange 134 at the inward or adjacent ends of the hubs and a plurality of flat generally rectangular blades 136 are rigidly secured to and project laterally from this hub in circumferentially spaced and radially disposed positions about the hubs 130. A circular rod 138 is welded or otherwise secured to the radially inner edges of the blades 136 inwardly from the axially outer ends of the blades in order to rigidify and brace the blades for the operation which they are to perform. As will be noted in FIGURE 1 in particular, each of the blades 136 lies in a plane which is inclined both with respect to the axis of the axle 118 and the plane of the flange 134. The arrangement is such that the tools 114 may be reversed upon their axles 118 so that in one position the inclination of the blades with respect to the direction of movement of the machine will serve to move soil rearwardly and towards the crop row lying between the pair of tools in order to effect a hilling operation upon the plants; while in the reverse position of the rotary tools they will move earth rearwardly and away from the crop row. This latter operation is desired since it will enable the blades to chop or cut weeds and move the same away from the plant row.

In the blades of the construction of FIGURE 3 it will be observed that the radially outer edge of the blades is preferably straight and provided with a sharp edge as indicated at 140, with the axially outer edges 142 of the blades being perpendicular to the axis of the shaft 118 and parallel to the flange 134, while the radially inner edges of the blades as shown at 144 are preferably inclined to increase the clearance between the hub and the blades.

Instead of the arrangement of FIGURES 1–3 in which a pair of rotary tools 114 are each carried by a spaced axle 118 in a tool unit 90, there may be provided rotary tools such as those shown in FIGURES 4 and 5 in which a single axle as at 150 serves to support a pair of rotary tools each indicated generally by the numeral 152 in FIGURE 4 or 154 in the embodiment of FIGURE 5.

In the embodiment of FIGURE 4 each of the rotary tools includes the hub 154 secured in axially adjusted positions upon the axle 150 by means of set screws 156 and with each hub having an annular radial flange 158 to which are fixedly secured blades 160. The blades of this construction are identical with those of FIGURE 3 being provided with the annular brace rod 162 corresponding to the rod 138 of FIGURE 3 with the arrangement and construction of the blades and the rod being identical with that of FIGURE 3. This form differs from that of FIGURE 3 solely in that a single axle is provided in place of the two aligned axles in FIGURE 3. When the arrangement of FIGURE 4 is utilized it is obvious that one of the driving chains 122 with the associated driving and driven sprockets 124 and 120 respectively may be omitted inasmuch as a single chain will be sufficient to operate the pair of rotary tools.

In FIGURE 5 a similar construction to that of FIGURE 4 is shown in which the single axle 168 carries the pair of tools 154 thereon. In this form, however, each of the tools includes a hub 170 which is secured in axially adjusted position upon the axle 168 as by the setscrews 172. In addition, a second hub 174 which is secured to the axle as by setscrew 176 carries a coulter disc 178, so that the coulter disc likewise can be removably adjusted upon the shaft 168.

In this embodiment the hub 170 has intermediate its extremities the radial disc 180 the periphery of which is secured a plurality of blades 182. As will be observed from FIGURE 5, each of these blades is notched intermediate its ends at 184 to receive the disc 180 therein whereby the blades may be welded or otherwise fixedly secured to the disc. Each of the blades in this form of the invention is of rectangular shape and as in the two other forms of the invention the planes of the blades are inclined both with respect to the axis of rotation of the shaft 168 and with respect to the plane of the disc 180.

In all three embodiments of FIGURES 3, 4 and 5, the blades may be reversed or interchanged in order to selectively effect a hilling operation for cultivating the plants of a crop row or to effect a chopping of weeds and discharging the same away from the row of plants. In addition, in FIGURE 5, when the rotating tools are reversed upon the axle 168, the coulter disc 178 may likewise be reversed in order to facilitate the operation of the blades. It will be observed that by abutting the coulter disc against the ends of the blades of FIGURE 5, the disc likewise serves as a reinforcement or strengthening element for the blades which are carried by the disc 180.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An agricultural device for mounting upon and operation by a tractor or vehicle comprising a support frame, means for securing said support frame to the side of a tractor in adjustably tilted positions about a horizontal axis extending transversely of the path of movement of the device, a carriage extending rearwardly of said support frame, means pivotally mounting said carriage upon said support frame for swinging about a horizontal axis transverse to said path of movement, actuating means connected to said support frame and carriage for effecting said swinging movement of the latter, a plurality of tool units each disposed below and extending rearwardly of said support frame, means independently and pivotally mounting said tool units in side-by-side spaced alignment upon said support frame and beneath said carriage, agricultural implements depending from and adjustably carried by said tool units and disposed for working crop rows as said device moves along said crop rows, vertically extending resilient connections securing each tool unit to said carriage, said tool units comprises laterally spaced pairs of substantially parallel and horizontal supports, an axle journaled in each pair of supports, means for imparting rotation to said axles, said agrictultural implements being each rotatably mounted on an axle.

2. An agricultural device for mounting upon and operation by a tractor or vehicle comprising a support frame, means for securing said support frame to the side of a tractor in adjustably tilted positions about a horizontal axis extending transversely of the path of movement of the device, a carriage extending rearwardly of said support frame, means pivotally mounting said carriage upon said support frame for swinging about a horizontal axis transverse to said path of movement, actuating means connected to said support frame and carriage for effecting said swinging movement of the latter, a plurality of tool units each disposed below and extending rearwardly of said support frame, means independently and pivotally mounting said tool units in side-by-side spaced alignment upon said support frame and beneath said carriage, agricultural implements depending from and adjustably carried by said tool units and disposed for working crop rows as said device moves along said crop rows, vertically extending resilient connections securing each tool unit to said carriage, said tool units comprising laterally spaced pairs of substantially parallel and horizontal supports, an axle journaled in each pair of supports, means for imparting rotation to said axles, said agricultural implements being each rotatably mounted on an axle, the agricultural implements of all of said units being mounted in axial alignment.

3. An agricultural device for mounting upon and operation by a tractor or vehicle comprising a support frame, means for securing said support frame to the side of a tractor in adjustably tilted positions about a horizontal axis extending transversely of the path of movement of the device, a carriage extending rearwardly of said support frame, means pivotally mounting said carriage upon said support frame for swinging about a horizontal axis transverse to said path of movement, actuating means connected to said support frame and carriage for effecting said swinging movement of the latter, a plurality of tool units each disposed below and extending rearwardly of said support frame, means independently and pivotally mounting said tool units in side-by-side spaced alignment upon said support frame and beneath said carriage, agricultural implements depending from and adjustably carried by said tool units and disposed for working crop rows as said device moves along said crop rows, vertically extending resilient connections securing each tool unit to said carriage, said tool units comprising laterally spaced pairs of substantially parallel and horizontal supports, an axle journaled in each pair of supports, means for imparting rotation to said axles, said agricultural implements being each rotatably mounted on an axle, each tool being disposed at one side of its unit with the tools of a pair of adjacent units being disposed in spaced relation between their respective units.

4. An agricultural device for mounting upon and operation by a tractor or vehicle comprising a support frame, means for securing said support frame to the side of a tractor in adjustably tilted positions about a horizontal axis extending transversely of the path of movement of the device, a carriage extending rearwardly of said support frame, means pivotally mounting said carriage upon said support frame for swinging about a horizontal axis transverse to said path of movement, actuating means connected to said support frame and carriage for effecting said swinging movement of the latter, a plurality of tool units each disposed below and extending rearwardly of said support frame, means independently and pivotally mounting said tool units in side-by-side spaced alignment upon said support frame and beneath said carriage, agricultural implements depending from and adjustably carried by said tool units and disposed for working crop rows as said device moves along said crop rows, vertically extending resilient connections securing each tool unit to said carriage, said tool units comprising laterally spaced pairs of substantially parallel and horizontal supports, an axle journaled in each pair of supports, means for imparting rotation to said axles, said agricultural implements being each rotatably mounted on an axle, said rotation imparting means comprising a driven element secured to each axle and disposed between its associated pair of supports, a common driving means journaled upon said support frame and connected to a source of power, means connecting said driving means to each driven element, said common driving means being located at the horizontal axis about which said tool units are pivoted to said support frame.

5. The combination of claim 4 wherein said common drive means comprises a shaft which constitutes said means for pivotally mounting said tool units.

6. An agricultural device for mounting upon and operation by a tractor or vehicle comprising a support frame, means for securing said support frame to the side of a tractor in adjustably tilted positions about a horizontal axis extending transversely of the path of movement of the device, a carriage extending rearwardly of said support frame, means pivotally mounting said carriage upon said support frame for swinging about a horizontal axis transverse to said path of movement, actuating means connected to said support frame and carriage for effecting said swinging movement of the latter, a plurality of tool units each disposed below and extending rearwardly of said support frame, means independently and pivotally mounting said tool units in side-by-side spaced alignment upon said support frame and beneath said carriage, agricultural implements depending from and adjustably carried by said tool units and disposed for working crop rows as said device moves along said crop rows, vertically extending resilient connections securing each tool unit to said carriage, said carriage at its end remote from its pivotal mounting including a transverse bar overlying said tool units and having its ends terminating between the two outermost tool units, said resilient connections engaging the ends of said transverse bar.

7. The combination of claim 6 including means rigidly connecting together the ends of a pair of adjacent tool units at the opposite ends of the latter for pivoting of said units in pairs, said resilient connecting means being each connected to one of said last mentioned means.

8. An agricultural device for mounting upon and operation by a tractor or vehicle comprising a support frame, means for securing said support frame to the side of a tractor in adjustably tilted positions about a horizontal axis extending transversely of the path of movement of the device, a carriage extending rearwardly of said support frame, means pivotally mounting said carriage upon said support frame for swinging about a horizontal axis transverse to said path of movement, actuating means connected to said support frame and carriage for effecting said swinging movement of the latter, a plurality of tool units each disposed below and extending rearwardly of said support frame, means independently and pivotally mounting said tool units in side-by-side spaced alignment upon said support frame and beneath said carriage, agricultural implements depending from and adjustably carried by said tool units and disposed for working crop rows as said device moves along said crop rows, vertically extending resilient connections securing each tool unit to said carriage, said tool units comprising laterally spaced pairs of substantially parallel and horizontal supports, an axle journaled in each pair of supports, means for imparting rotation to said axles, said agricultural implements being each rotatably mounted on an axle, brackets secured to and depending from each horizontal support, said axle being disposed between and journalled in said brackets and beneath said horizontal supports.

9. An agricultural device for mounting upon and operation by a tractor or vehicle comprising a support frame, means for securing said support frame to the side of a tractor in adjustably tilted positions about a horizontal axis extending transversely of the path of movement of the device, a carriage extending rearwardly of said support frame, means pivotally mounting said carriage upon said support frame for swinging about a horizontal axis transverse to said path of movement, actuating means connected to said support frame and carriage for effecting said swinging movement of the latter, a plurality of tool units each disposed below and extending rearwardly of said support frame, means independently and pivotally mounting said tool units in side-by-side spaced alignment upon said support frame and beneath said carriage, agricultural implements depending from and adjustably carried by said tool units and disposed for working crop rows as said device moves along said crop rows, vertically extending resilient connections securing each tool unit to said carriage, said tool units comprising laterally spaced pairs of substantially parallel and horizontal supports, an axle journaled in each pair of supports, means for imparting rotation to said axles, said agricultural implements being each rotatably mounted on an axle, said horizontal frame having a plurality of rigidly mounted rearwardly extending parallel horizontal members, said tool units each including at one end thereof an upwardly projecting bracket, said pivot means securing each bracket to one of said horizontal members.

References Cited in the file of this patent

UNITED STATES PATENTS

| | | |
|---|---|---|
| 1,690,252 | Schumacher et al. | Nov. 6, 1928 |
| 1,898,353 | Everett et al. | Feb. 21, 1933 |
| 2,328,064 | Doty | Aug. 31, 1943 |
| 2,332,616 | Tuft | Oct. 26, 1943 |
| 2,364,043 | Ariens | Dec. 5, 1944 |
| 2,366,386 | Clark | Jan. 2, 1945 |
| 2,560,352 | Kelsey | July 10, 1951 |
| 2,689,510 | Petermann | Sept. 21, 1954 |
| 2,711,125 | Szymczak | June 21, 1955 |
| 2,928,484 | Blocker | Mar. 15, 1960 |
| 2,960,173 | Stone | Nov. 15, 1960 |

FOREIGN PATENTS

| | | |
|---|---|---|
| 506,304 | France | Mar. 27, 1920 |